(12) United States Patent
Joshi et al.

(10) Patent No.: US 8,002,101 B2
(45) Date of Patent: *Aug. 23, 2011

(54) TORQUE BASED PARK LOCK ASSEMBLY

(75) Inventors: Jayant Joshi, Bangalore (IN); Uday P. Korde, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/946,342

(22) Filed: Nov. 15, 2010

(65) Prior Publication Data

US 2011/0056795 A1 Mar. 10, 2011

Related U.S. Application Data

(63) Continuation of application No. 11/970,778, filed on Jan. 8, 2008, now Pat. No. 7,832,541.

(51) Int. Cl.
*B60T 1/06* (2006.01)

(52) U.S. Cl. .................................. 192/219.4; 188/77 R

(58) Field of Classification Search ............... 192/219.4, 192/219.5

See application file for complete search history.

(56) References Cited

U.S. PATENT DOCUMENTS

| | | | |
|---|---|---|---|
| 3,703,941 A | 11/1972 | Ohie et al. | |
| 5,236,066 A * | 8/1993 | O'Neal et al. | ............... 188/1.12 |
| 5,531,303 A | 7/1996 | Raszkowski | |
| 5,704,457 A | 1/1998 | Kimura et al. | |
| 6,125,983 A | 10/2000 | Reed, Jr. et al. | |
| 6,279,713 B1 | 8/2001 | Young et al. | |
| 2009/0173594 A1 | 7/2009 | Joshi | |

* cited by examiner

*Primary Examiner* — Richard M. Lorence

(57) ABSTRACT

A torque based park lock assembly for motor vehicles, especially passenger cars and trucks equipped with automatic transmissions, includes a lobed wheel secured to a transmission output shaft and a rotation restricting flexible lever which may be selectively moved into engagement with the lobed wheel by a cam. A bi-directional motor rotates the cam. A return spring translates the lever away from the lobed wheel when the cam is rotated into a disengaged (non-Park) position.

20 Claims, 2 Drawing Sheets

TORQUE BASED PARK LOCK ASSEMBLY

CROSS-REFERENCE TO RELATED APPLICATIONS

Figure 1:
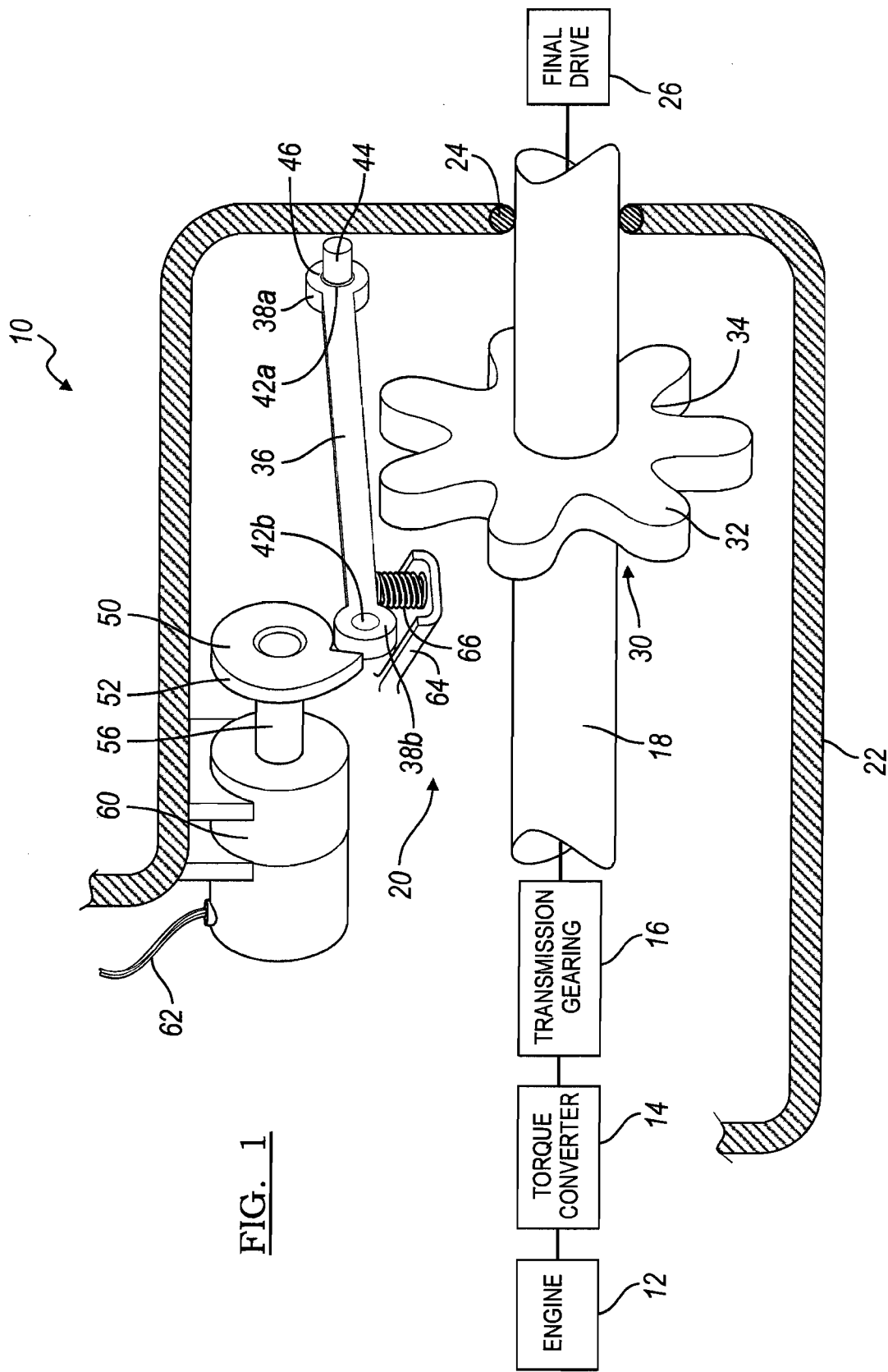

This application is a continuation of U.S. application Ser. No. 11/970,778 filed Jan. 8, 2008. The disclosure of the above application is incorporated herein by reference.

FIELD

The present disclosure relates generally to park mechanisms for motor vehicles and more particularly to an improved torque based park lock system utilizing a lobed wheel secured to the output shaft of a transmission.

BACKGROUND

The statements in this section merely provide background information related to the present disclosure and may or may not constitute prior art.

In vehicles equipped with automatic transmissions, a mechanism must be provided to lock the transmission and vehicle drive wheels in the Park or P position of the transmission to preclude rotation of the drive wheels and motion of the vehicle when it is parked.

While there are many variations, the basic transmission park mechanism typically includes a cogged or toothed wheel which rotates with the automatic transmission output shaft and a pawl that may be selectively engaged with the teeth of the wheel to prevent its rotation and thus motion of the vehicle.

Because a simple pawl and cog mechanism could be damaged or rendered inoperable if engaged while the vehicle is moving, current designs allow for this contingency by establishing a lock speed. Below the lock speed, the pawl engages and renders the drive line and vehicle stationary. Above the lock speed, the mechanism allows drive line and vehicle motion. If the chosen lock speed is high, loads on the system are high; if the chosen lock speed is low, a vehicle parked on a grade may roll away. Obviously, therefore, selection of the proper lock speed is both important and a balance of several engineering and performance parameters.

The typical cog and pawl park mechanism also comprehends several components such as an actuator, an actuator spring, a return spring, a pawl, a guide and a cogged or toothed park gear. In view of the foregoing, the present inventors have determined that improvements to park lock mechanisms are both desirable and possible.

SUMMARY

The present invention provides an improved, torque based park lock assembly for motor vehicles, especially passenger cars and trucks equipped with automatic transmissions. The assembly includes a lobed wheel secured to a transmission output shaft and a rotation restricting flexible lever or arm which may be selectively moved into engagement with the lobed wheel by a cam rotated by a bi-directional motor. A return spring translates the lever away from the lobed wheel when the cam is rotated into a disengaged (non-Park, i.e., operating) position. In an alternate embodiment, the lobed wheel includes rollers on each lobe to reduce friction.

Another aspect of the present invention provides an improved, torque based park lock assembly for automatic transmissions.

Another aspect of the present invention provides a park lock assembly for automatic transmissions having a lobed wheel and a flexible lever which may be selectively moved into engagement with the wheel.

Another aspect of the present invention provides a park lock assembly for automatic transmissions having a lobed wheel with a friction reducing roller on each lobe and a flexible arm which may be selectively moved into engagement with the rollers.

Another aspect of the present invention provides a park lock assembly for automatic transmissions having a lobed wheel and a flexible lever which may be selectively moved into engagement with the wheel by a cam and a bi-directional motor.

Another aspect of the present invention provides a park lock assembly for automatic transmissions having a lobed wheel with a friction reducing roller on each lobe and a flexible arm which may be selectively moved into engagement with the rollers by a cam and bi-directional motor.

Another aspect of the present invention provides a park lock assembly for automatic transmissions having a lobed wheel and a flexible lever which is moved out of engagement by a return spring.

Another aspect of the present invention provides a park lock assembly for automatic transmissions having a lobed wheel with a friction reducing roller on each lobe and a flexible arm which is moved out of engagement by a return spring.

Further advantages and areas of applicability will become apparent from the description provided herein. It should be understood that the description and specific examples provided are intended for purposes of illustration only and are not intended to limit the scope of the present disclosure.

DRAWINGS

The drawings described herein are for illustration purposes only and are not intended to limit the scope of the present disclosure in any way.

Figure 3:
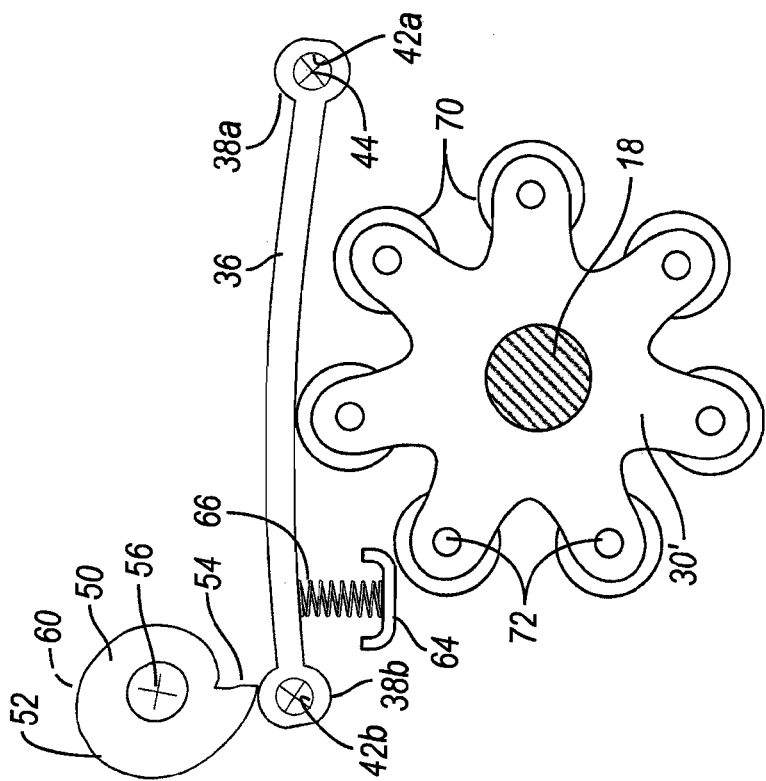
Figure 2:
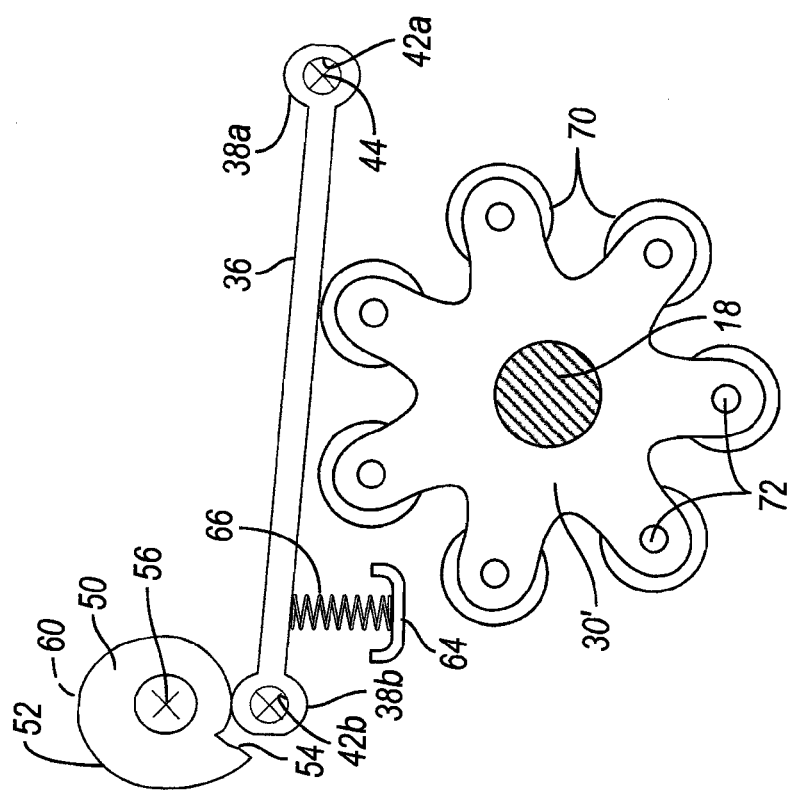

FIG. 1 is a perspective view of a park lock assembly according to a first embodiment of the present invention in an automatic transmission and motor vehicle drive train;

FIG. 2 a side elevational view of a park lock assembly according to another embodiment of the present invention in a disengaged (non-Park) state or operating mode; and FIG. 3 a side elevational view of a park lock assembly according to another embodiment of the present invention in an engaged (Park) state or operating mode.

DETAILED DESCRIPTION

The following description is merely exemplary in nature and is not intended to limit the present disclosure, application, or uses.

With reference now to FIG. 1, a motor vehicle drive train is illustrated and generally designated by the reference number 10. The motor vehicle drive train 10 includes a prime mover such as an internal combustion engine 12 which may be either gas, E85 or Diesel fueled. Alternatively, the engine 12 may be a full electric or a hybrid power plant utilizing both one or more electric motors and an internal combustion engine. Typically, the output of the engine 12 is directly coupled to and drives an input of a torque converter 14 and the output of the torque converter 14 is directly coupled to and drives an input of a multiple speed automatic transmission assembly 16. The automatic transmission assembly 16 will typically include a plurality of planetary gear sets, clutches, brakes and actuators that are selectively engaged to provide a plurality of forward gear ratios and one reverse gear ratio. Power from the automatic transmission assembly 16 is delivered by an output shaft 18 with which a park lock assembly 20 according to the present invention is associated. The automatic transmission assembly 16 and the park lock assembly 20 are received within a metal housing 22 which is typically cast aluminum or magnesium. A resilient seal 24 is disposed between the output shaft 18 and the housing 22 and provides a fluid tight seal therebetween to retain transmission fluid (not illustrated) in the housing 22. The output shaft 18 is coupled to and drives a final drive assembly 26 which may include a prop shaft, a differential, a pair of axles and wheels and tires (all not illustrated).

The park lock assembly 20 includes a lobed wheel 30 having a plurality of radially projecting, rounded fingers or lobes 32 alternating with rounded, reduced diameter recesses 34. The lobed wheel 30 is secured to the output shaft 18 by any suitable means such as welding, staking, interengaging splines and snap rings or a key (all not illustrated) and rotates therewith. While seven of the lobes 32 are illustrated, it should be appreciated that the number of lobes 32 may be adjusted up or down if a suitable dimensional difference between the radial distance to the tips of the lobes 32 and the radial distance to a chordal reference line extending between two ends of two adjacent lobes 32 is great enough that the park lock assembly 20 will operate properly, i.e., provide sufficient restraining torque to the output shaft 18 when engaged to inhibit vehicle motion. Fewer lobes 32 facilitate generation of greater restraining torque but may cause undesirably abrupt engagement of Park whereas more lobes 32 will provide smoother engagement but may not generate sufficient restraining torque.

Aligned with the lobed wheel 30 is a stiffly resilient lever arm 36 having a first enlarged circular end 38a which defines a first through opening 42a and a second enlarged circular end 38b which defines a second through opening 42b. The first through opening 42a receives a pivot pin 44 which may be secured to and extend from the housing 22 which pivotally supports the lever arm 36. A snap ring 46 or other retaining feature or treatment such as staking maintains the lever arm 36 on the pivot pin 44. The pivot pin 44 may include a shoulder (not illustrated) to further axially locate the lever arm 36.

The second enlarged circular end 38b of the lever arm 36 is disposed operably adjacent and engages a rotatable cam 50. The rotatable cam 50 defines a surface 52 having a unitary, i.e., smoothly increasing (or decreasing), profile and a single, radially extending wall or shoulder 54. It should be appreciated that the exterior surface of the first enlarged circular end 38a of the lever arm 36 is essentially unimportant whereas the first through opening 42a provides a pivoting mounting. Likewise, the second through opening 42b is essentially unimportant whereas the second enlarged circular end 38b provides an appropriate curved surface which functions as a cam follower engaging the surface 52 of the rotatable cam 50. The lever arm 36 is preferably fabricated in this configuration, however, to simplify and speed manufacture of the park lock assembly 20 as it may be installed and will function in any orientation.

The rotatable cam 50 is secured to and rotates with an output shaft 56 of a bi-directional motor and gear reduction assembly 60 which is supplied with electrical energy through a multiple conductor cable 62. The motor and gear reduction assembly 60 are preferably configured, either electrically or mechanically, to rotate the output shaft 56 and the cam 50 approximately 320° to 330° and in any event less than 360°.

An ear or projection 64 extending from the inner surface of the housing 22 receives and supports a return or compression spring 66 which engages a side of the lever arm 36 opposite the rotatable cam 50. The return spring 66 provides a biasing force to the lever arm 36 and ensures that it moves away from and out of contact with the lobed wheel 30 when the rotatable cam 50 is in its non-Park position illustrated in FIG. 1. Alternatively, the compression spring 66 may be replaced with a tension spring (not illustrated) disposed on the opposite side of the lever arm 36 or a torsion spring (not illustrated) disposed about the axis of the pivot pin 44.

Turning now to FIGS. 2 and 3, an alternate embodiment of the lobed wheel 30 is illustrated and designated by the reference number 30'. The alternate embodiment lobed wheel 30' is designed and intended to be a lower friction device and thus includes a plurality of friction reducing rollers 70 rotatably disposed in aligned pairs of circular openings 72 proximate the ends of the lobes 32' such that the lever arm 36 engages the rollers 70 rather than the surfaces of the lobes 32.

Operation of the park lock assembly 20 according to the present invention will now be described with reference to FIGS. 2 and 3. It should be understood that this description applies equally to the embodiment having the lobed wheel 30 illustrated in FIG. 1. In FIG. 2, the rotatable cam 50 is in a non-Park position or operating mode. As such, the lever arm 36 is biased and moved up by the return spring 66 and the lever arm 36 is out of contact with the rollers 72 on the lobed wheel 30' which is therefore free to rotate. This is the position of the lobed wheel 30' and the lever arm 36 during operation of the motor vehicle drive train 10 in forward and reverse gears and neutral.

In FIG. 3, the gear selector (not illustrated) has been moved to Park or P and the rotatable cam 50 has rotated into the Park position, translating the second end 38b of the lever arm 36 down such that the center portion of the lever arm 36 engages the rollers 72 of the lobed wheel 30'. The force exerted by the lever arm 36 on the rollers 72 of the lobed wheel 30' will inhibit rotation of the output shaft 18 up to a maximum torque value at which point the lever arm 36 will flex sufficiently that the output shaft 18 will rotate until the torque on the output shaft 18 drops below the maximum torque value. When this occurs, the lever arm 36 will once again prevent rotation of the output shaft 18.

It will thus be appreciated that the park lock assembly 20 according to the present invention represents an improvement from many operating perspectives. First of all, the assembly 20 is torque based rather than engagement speed based as are current designs. Second of all, the assembly 20 is symmetrical in configuration which thus provides the same performance during both forward and reverse engagement. Third, the assembly 20 ratchets more smoothly and quietly than current designs if engaged while the vehicle is in motion. Lastly, the assembly 20 is more rugged than current designs since engagement at high vehicle speeds causes the same flexing of the lever arm 36 as does engagement at lower speeds.

As noted, the foregoing description of the invention is merely exemplary in nature and variations that do not depart from the gist of the invention are intended to be within the scope of the invention. Such variations are not to be regarded as a departure from the spirit and scope of the invention.

What is claimed is:

1. A park lock assembly for an automatic transmission, the park lock assembly comprising:

a wheel coupled for common rotation with an output shaft of the transmission, the wheel including a plurality of radial projections including an end portion having an outer surface, wherein the plurality of radial projections define a plurality of radial recesses disposed circumferentially between the plurality of radial projections;

a resilient arm disposed adjacent the wheel and including a first end, a second end, and an engagement surface opposing the outer surface of the end portion of the plurality of radial projections, wherein the resilient arm is positionable between an engaged position and a disengaged position, and wherein the engagement surface contacts the outer surface of the end portion in the engaged position and is separated from the outer surface in the disengaged position; and a positioning assembly engaged with the resilient arm to move the resilient arm between the disengaged position and the engaged position, whereby the resilient arm provides a flexing force from the engagement surface of the resilient arm to the outer surface of the wheel in the engaged position, and whereby the flexing force includes a radial component force directed radially inward on the wheel and a tangential component force that resists rotation of the wheel.

2. The park lock assembly of claim 1 wherein the positioning assembly includes an engagement mechanism.

3. The park lock assembly of claim 2 wherein the engagement mechanism includes a rotatable cam.

4. The park lock assembly of claim 3 wherein the engagement mechanism includes a bi-directional motor coupled for rotation with the rotatable cam.

5. The park lock assembly of claim 1 wherein the positioning assembly includes a biasing member engaged with the resilient arm to bias the resilient arm towards the disengaged position.

6. The park lock assembly of claim 5 wherein the biasing member is a spring.

7. The park lock assembly of claim 6 wherein the spring is a compression spring.

8. The park lock assembly of claim 1 wherein the plurality of radial projections include rounded ends.

9. The park lock assembly of claim 1 wherein the end portion of each of the plurality of radial projections is a roller.

10. The park lock assembly of claim 1 wherein the first end of the resilient arm is pivotally engaged with a fixed member, and wherein the second end of the resilient arm rotates about the first end to move between the disengaged position and the engaged position.

11. The park lock assembly of claim 1 wherein the engagement surface of the resilient arm is substantially planar when the resilient arm is in the disengaged position.

12. The park lock assembly of claim 1 wherein the resilient arm has physical properties preselected to allow the wheel to rotate when a predetermined torque is applied to the wheel and to allow the resilient arm to elastically deform during rotation of the wheel when the resilient arm is in the engaged position.

13. A park lock assembly for an automatic transmission having an output shaft, the park lock assembly comprising:
 a housing;
 a lobed wheel secured for rotation with the output shaft of the automatic transmission;
 a lever arm operably disposed adjacent the lobed wheel and having a first end and a second end, the first end pivotally secured to the housing;
 an engagement assembly for selectively engaging and disengaging the park lock assembly; and
 a return spring for biasing the lever arm away from the lobed wheel.

14. The park lock assembly of claim 13 wherein the lobed wheel includes a plurality of rollers rotatably supported by a plurality of lobes of the lobed wheel.

15. The park lock assembly of claim 13 wherein the lobed wheel includes seven lobes.

16. The park lock assembly of claim 13 wherein the lever arm includes an enlarged circular portion and a through opening at the first and second ends.

17. The park lock assembly of claim 13 wherein the engagement assembly includes a rotatable cam.

18. The park lock assembly of claim 17 wherein the rotatable cam includes a single cam surface and shoulder.

19. The park lock assembly of claim 18 wherein the engagement assembly includes a bi-directional motor and gear assembly having an output coupled to the rotatable cam.

20. The park lock assembly of claim 13 wherein the return spring is a compression spring.

* * * * *